United States Patent
Ishikawa et al.

(10) Patent No.: US 10,257,385 B2
(45) Date of Patent: Apr. 9, 2019

(54) OPTICAL PRINT HEAD, IMAGE FORMING APPARATUS AND LIGHT AMOUNT CORRECTION METHOD OF OPTICAL PRINT HEAD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventors: Hiroyuki Ishikawa, Shizuoka (JP); Koji Tanimoto, Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/955,945

(22) Filed: Apr. 18, 2018

(65) Prior Publication Data
US 2018/0241907 A1 Aug. 23, 2018

Related U.S. Application Data (63) Continuation of application No. 15/429,437, filed on Feb. 10, 2017, now Pat. No. 9,979,856, which is a (Continued)

(51) Int. Cl.
*G03G 15/04* (2006.01)
*H04N 1/40* (2006.01)
(Continued)

(52) U.S. Cl.
CPC ....... *H04N 1/40037* (2013.01); *G03G 15/043* (2013.01); *G03G 15/04054* (2013.01);
(Continued)

(58) Field of Classification Search
CPC .................................................. H04N 1/40037
(Continued)

(56) References Cited

U.S. PATENT DOCUMENTS

| | | | |
|---|---|---|---|
| 6,731,322 B2* | 5/2004 | Hori | B41J 2/451 347/238 |
| 2009/0147278 A1 | 6/2009 | Tsujino et al. | |

(Continued)

FOREIGN PATENT DOCUMENTS

JP 07-266611 10/1995

OTHER PUBLICATIONS

Non-Final Office Action for U.S. Appl. No. 15/171,028 dated May 30, 2017, 17 Pages.

(Continued)

*Primary Examiner* — Quana Grainger
(74) *Attorney, Agent, or Firm* — Amin, Turocy & Watson LLP (57) ABSTRACT

An optical print head comprises a first light emitting element row, a second light emitting element row, a lens array, a first drive circuit and a second drive circuit. The first light emitting element row includes the arrangement of first light emitting elements. The second light emitting element row includes second light emitting elements arranged in parallel with the first light emitting element row. The lens array concentrates light emitted by the first light emitting elements and the second light emitting elements. The first drive circuit drives each first light emitting element with an identical first current value. The second drive circuit drives each second light emitting element with an identical second current value different from the first current value.

10 Claims, 9 Drawing Sheets

Related U.S. Application Data continuation-in-part of application No. 15/171,028, filed on Jun. 2, 2016, now abandoned.

(51) Int. Cl.
  *G06K 15/12* (2006.01)
  *G03G 15/043* (2006.01)
  *G06K 15/02* (2006.01)

(52) U.S. Cl.
  CPC ....... *G06K 15/027* (2013.01); *G06K 15/1238* (2013.01); *G06K 15/1247* (2013.01); *H04N 1/40031* (2013.01); *H04N 2201/0082* (2013.01)

(58) Field of Classification Search
  USPC .......................................................... 399/51
  See application file for complete search history.

(56) References Cited

U.S. PATENT DOCUMENTS

| | | |
|---|---|---|
| 2009/0189970 A1 | 7/2009 | Koizumi et al. |
| 2012/0113208 A1 | 5/2012 | Ishikawa et al. |
| 2016/0131989 A1 | 5/2016 | Yano et al. |

OTHER PUBLICATIONS

Non-Final Office Action for U.S. Appl. No. 15/429,437 dated Aug. 11, 2017, 23 Pages.

\* cited by examiner

OPTICAL PRINT HEAD, IMAGE FORMING APPARATUS AND LIGHT AMOUNT CORRECTION METHOD OF OPTICAL PRINT HEAD

CROSS-REFERENCE TO RELATED APPLICATIONS

This application is a Continuation of application Ser. No. 15/429,437 filed Feb. 10, 2017, which is a Continuation-in-Part of application Ser. No. 15/171,028 filed Jun. 2, 2016, the entire contents of all of which are incorporated herein by reference.

FIELD

Embodiments described herein relate generally to a technology for suppressing dispersion of light from an optical print head.

BACKGROUND

Conventionally, there is an optical print head in which two rows of light emitting elements are arranged in parallel below a rod lens array in which two rows of rod lenses arranged in parallel are integrated. The two rows of the light emitting elements are positioned alternately in an extending direction of the light emitting element rows.

In the optical print head, there is a case in which undesirable dispersion of light of each light emitted through the rod lens array by each light emitting element occurs. As the main reason of the dispersion, there is dispersion of luminous efficiency of each light emitting element and dispersion of a drive circuit connected with each light emitting element. As the main reason of the dispersion, there is dispersion of the refractive index distribution of the rod lens array and dispersion of a positional relation of each light emitting element with respect to each of the rod lens.

In a case of incorporating the optical print head in an image forming apparatus, the light emitted by each light emitting element forms a beam spot corresponding to one dot on a photoconductor. If there is dispersion of light of each light emitting element, density unevenness of an image occurs and the image quality is degraded. Thus, at the time of shipping the optical print head or at the time of shipping the image forming apparatus incorporated with the optical print head, a light amount correction operation for reducing the dispersion of the light is executed in manufacturing lines.

The amount of light dispersed by the light emitting element depends on an applied current value and light emitting time. In light amount correction, first, currents with the same value are applied to each light emitting element, and the light amount of each light emitting element (light amount of each light emitted through the rod lens array by each light emitting element) is measured. Next, under the condition of the application of the currents with the same value, the light emitting time of each light emitting element is adjusted with a PWM (Pulse Width Modulation) control so that the amounts of the light of the light emitting elements become identical. Correction information serving as an adjustment amount of the light emitting time of each light emitting element is information unique to the optical print head.

In the light amount correction, next, the correction information is written into a built-in memory of the optical print head. Through reading the correction information from the optical print head, the dispersion of the light of each light emitting element can be suppressed.

Incidentally, if the incorporation position of the light emitting element rows and the rod lens array deviates from an ideal position, a difference occurs in light transmittance. Thus, there is a case in which the amounts of light from the light emitting element rows are greatly different. If the amounts of light from the light emitting element rows are greatly different, there is a problem that the dispersion of the light cannot be completely suppressed through the light amount correction according to the light emitting time.

DETAILED DESCRIPTION

Generally, in accordance with an embodiment, an optical print head comprises a first light emitting element row, a second light emitting element row, a lens array, a first drive circuit and a second drive circuit. The first light emitting element row refers to the arrangement of first light emitting elements. The second light emitting element row refers to the arrangement of second light emitting elements in parallel with the first light emitting element row. The lens array concentrates light emitted by the first light emitting elements and the second light emitting elements. The first drive circuit drives each first light emitting element with an identical first current value. The second drive circuit drives each second light emitting element with an identical second current value different from the first current value.

Generally, in accordance with the present embodiment, an image forming apparatus comprises a photoconductor, an optical print head and a developing device. The optical print head refers to the foregoing optical print head which forms an electrostatic latent image on the photoconductor. The developing device develops the electrostatic latent image to form a toner image on the photoconductor.

Generally, in accordance with the present embodiment, a light amount correction method is a light amount correction method of an optical print head which comprises a first light emitting element row including the arrangement of first light emitting elements, a second light emitting element row including the arrangement of second light emitting elements in parallel with the first light emitting element row, and a lens array for concentrating light emitted by the first light emitting elements and the second light emitting elements. The light amount correction method can include a first step, a second step and a third step. The first step refers to driving the first light emitting element with a first current value at a first light emitting time and measuring a first light amount of the first light emitting element through the lens array. The second step refers to driving the second light emitting element with the first current value at the first light emitting time and measuring a second light amount of the second light emitting element through the lens array. The third step refers to driving the first light emitting element with a second current value different from the first current value at the first light emitting time and measuring a third light amount of the first light emitting element through the lens array to calculate a third current value of current through which the light amount of the first light emitting element through the lens array becomes the second light amount when the first light emitting element is driven at the first light emitting time, or driving the second light emitting element with a fourth current value different from the first current value at the first light emitting time and measuring a fourth light amount of the second light emitting element through the lens array to calculate a fifth current value of current through which the light amount of the second light emitting element through the lens array becomes the first light amount when the second light emitting element is driven at the first light emitting time.

Hereinafter, embodiments are described with reference to the accompanying drawings.

Figure 1:
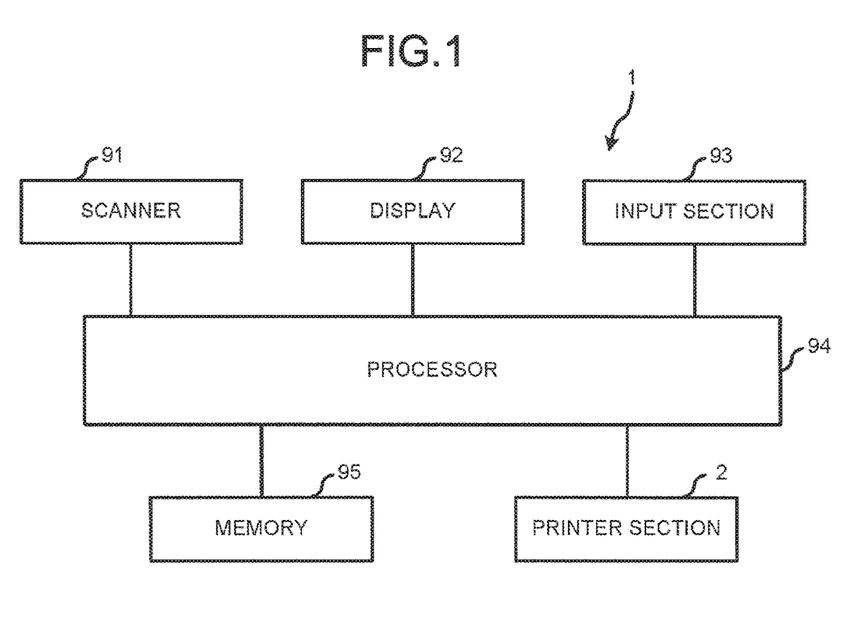
FIG. 1 is a block diagram illustrating control components of an image forming apparatus.

FIG. 1 is a block diagram illustrating control components of an image forming apparatus 1.

In the image forming apparatus 1, a processor 94, which is a CPU (Central Processing Unit), executes programs stored in a memory 95 to execute various processing of the image forming apparatus 1. A display 92 displays setting information or operation status of the image forming apparatus 1, log information and notification to a user. An input section 93 including a touch panel or buttons receives input of the user. The processor 94 first reads an image of a document with a scanner 91 in a copy processing.

Figure 2:
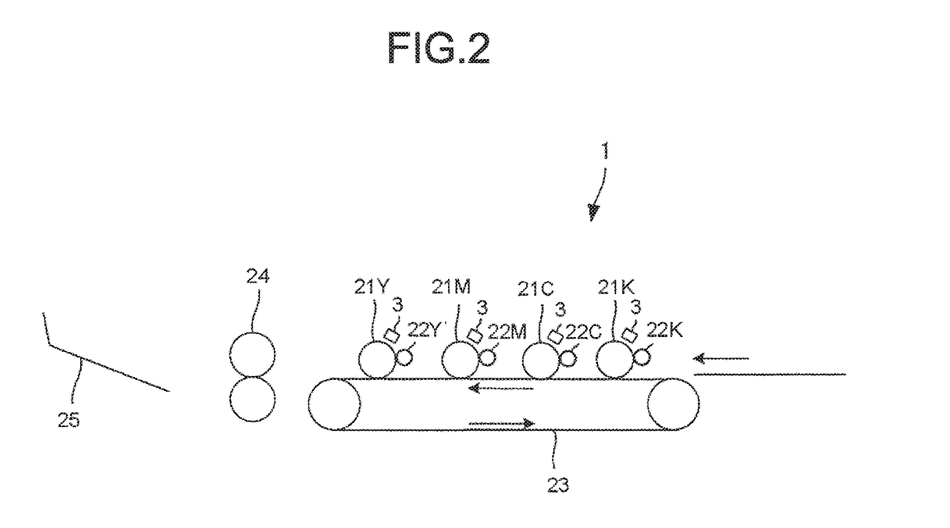
FIG. 2 is a diagram illustrating the structure of a printer section.

FIG. 2 is a diagram illustrating the structure of a printer section 2.

The processor 94 forms electrostatic latent images based on image data on photoconductive drums 21Y~21K with an optical print head 3. The 21Y~21K refers to 21Y, 21M, 21C and 21K. Y is yellow, M is magenta, C is cyan, and K is black. The other reference signs are the same as described above.

The processor 94 develops the electrostatic latent images on the photoconductive drums 21Y~21K with developing devices 22Y~22K through Y~K toners. Y~K toner images are formed on the photoconductive drums 21Y~21K.

The processor 94 transfers Y~K toner images on the photoconductive drums 21Y~21K onto a transfer belt 23 in the order of Y, M, C and K in an overlapped manner. One color image is formed on the transfer belt 23. The processor 94 transfers the color image from the transfer belt 23 to a sheet at a secondary transfer position U. The secondary transfer position U is a position at which a secondary transfer roller 24 and the transfer belt 23 together form a nip.

The processor 94 heats the sheet with a fixing device 25 and discharges the sheet to a tray (not shown) after the image is fixed on the sheet.

Figure 3:
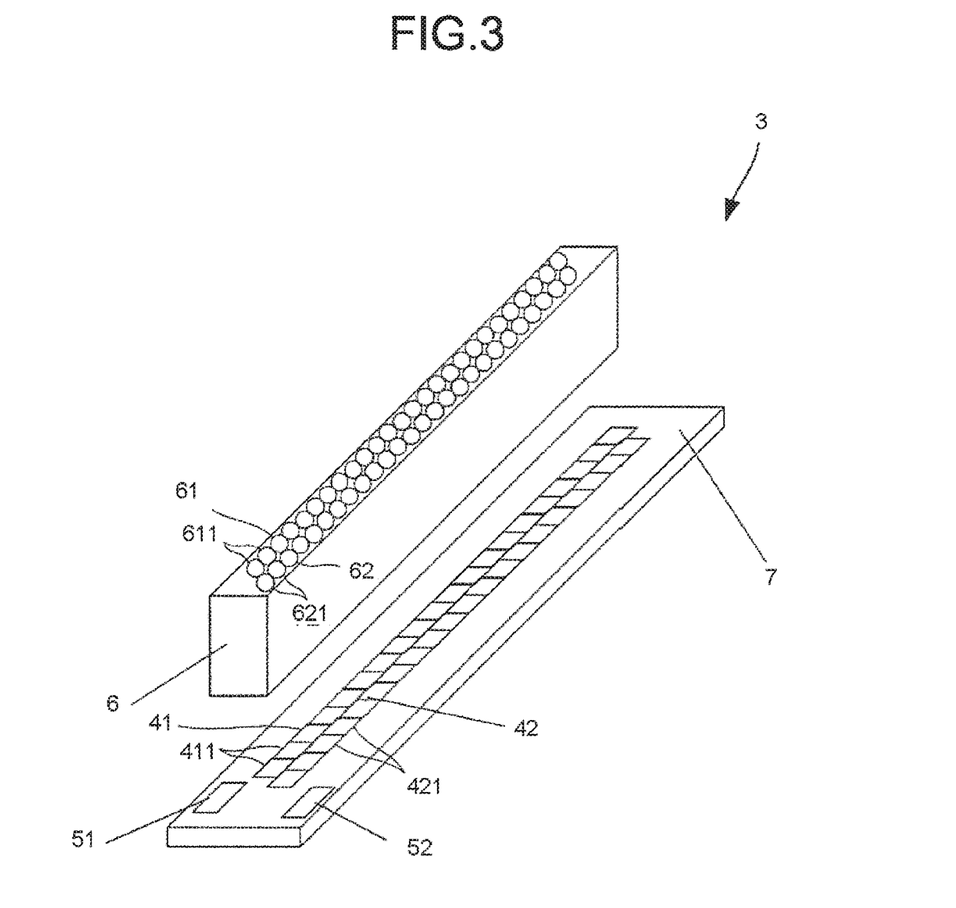
FIG. 3 is a perspective view illustrating the structure of an optical print head.

FIG. 3 is a perspective view illustrating the structure of the optical print head 3.

The optical print head 3 is equipped with a first light emitting element row 41, a second light emitting element row 42, a first drive circuit 51, a second drive circuit 52, a memory 53 (refer to FIG. 7) and a microlens array 6.

The light emitting element rows 41 and 42 and the drive circuits 51 and 52 are arranged on a substrate 7 made from glass or resin.

A first light emitting element 411 emits light upwards in FIG. 3 (direction orthogonal to the substrate 7). The first light emitting elements 411 are arranged in a horizontal scanning direction to form the first light emitting element row 41. The horizontal scanning direction refers to a direction in which a beam spot moves along an axial direction of the photoconductive drums 21Y~21K when the first light emitting element row 41 emits light to the photoconductive drums 21Y~21K.

A second light emitting element 421 emits the light towards the upside of FIG. 3.

The substrate 7 is a top emission type substrate on which the light is emitted from upper surfaces of the first light emitting element row 41 and the second light emitting element row 42 simultaneously.

The second light emitting elements 421 are arranged in a row in the horizontal scanning direction to form the second light emitting element row 42. The second light emitting element row 42 is positioned at one side (right side in FIG. 3) of the vertical scanning direction with respect to the first light emitting element row 41. The vertical scanning direction refers to a direction orthogonal to the horizontal scanning direction. The second light emitting element row 42 is arranged in parallel with the first light emitting element row 41 in the vertical scanning direction.

The light emitting elements 411 and 421 are positioned alternately in the horizontal scanning direction.

The light emitting elements 411 and 421 can be organic electroluminescence elements. The light emitting elements 411 and 421 each at least include an anode which injects an electron hole, a light emitting layer having alight emitting area, and a cathode which injects an electron.

The first drive circuit 51 drives the first light emitting element row 41. The first drive circuit 51 can set a current value for the first light emitting element row 41. The first drive circuit 51 can execute the PWM control on the first light emitting element 411 individually through the set current value. The first drive circuit 51 can individually control the light emitting time of the first light emitting element 411. The first drive circuit 51 is positioned at the one side (left side in FIG. 3) of the vertical scanning direction with respect to the first light emitting element row 41. The first drive circuit 51 is positioned at a location nearest to the first light emitting element 411 at the end of one side (front side in FIG. 3) of the horizontal scanning direction among the first light emitting elements 411.

The second drive circuit 52 drives the second light emitting element row 42. The second drive circuit 52 can set a current value for the second light emitting element row 42. The second drive circuit 52 can execute the PWM control on the second light emitting element 421 individually through the set current value. The second drive circuit 52 can control the light emitting time of the second light emitting element 421 individually. The second drive circuit 52 is positioned at the other side (right side in FIG. 3) of the vertical scanning direction with respect to the second light emitting element row 42. The second drive circuit 52 is positioned at a location nearest to the second light emitting element 421 at the end of one side (front side in FIG. 3) of the horizontal scanning direction among the second light emitting elements 421.

The drive circuits 51 and 52 are opposite to each other in the vertical scanning direction.

The first drive circuit 51 is positioned at the one side (left side in FIG. 3) of the vertical scanning direction with respect to the first light emitting element row 41. The second drive circuit 52 is positioned at the other side (right side in FIG. 3) of the vertical scanning direction with respect to the second light emitting element row 42. Thus, the wiring for connecting the first drive circuit 51 with the first light emitting element 411 and the wiring for connecting the second drive circuit 52 with the second light emitting element 421 are not overlapped.

The rod lens array 6 is equipped with a plurality of integrated columnar rod lenses 611 and 621. The rod lenses 611 are arranged in a row in a scanning direction to form a rod lens row 61. The rod lenses 621 are arranged in a row in the scanning direction to form a rod lens row 62. The rod lens rows 61 and 62 are arranged in the vertical scanning direction in parallel. The rod lens array 6 is positioned at the upper side in FIG. 3 of the light emitting element rows 41 and 42 and opposite to the light emitting element rows 41 and 42. The rod lens array 6 enables the light emitted by each of the light emitting elements 411 and 421 to be imaged on the photoconductive drums 21Y~21K as beam spots.

In the present embodiment, the rod lens rows 61 and 62 are arranged corresponding to the first and the second light emitting element rows 41 and 42. However, one rod lens row may be arranged corresponding to a plurality of (e.g., 2) light emitting element rows.

Figure 4:
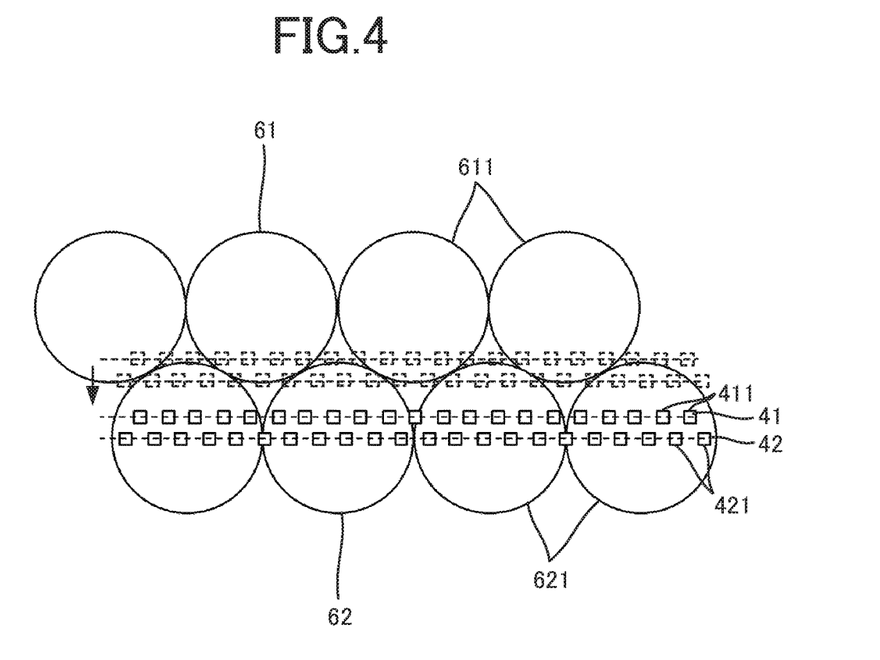
FIG. 4 is a diagram illustrating a positional relation between light emitting element rows and rod lenses.

FIG. 4 is a diagram illustrating a positional relation between the light emitting element rows 41 and 42 and the rod lenses 611 and 621.

The diameter of each of the rod lenses 611 and 621 is, for example, 900 μm.

The light emitting surface of each of the light emitting elements 411 and 421 is a rectangular shape and dimension of two sides (length and width) of the light emitting surface is 30 μm*30 μm, for example.

The light emitting elements 411 and 421 are arranged alternately in the horizontal scanning direction (right and left direction of FIG. 4). If resolution in the horizontal scanning direction is 1200 dpi, for example, the interval of the central parts of the light emitting elements 411 and 421 adjacent to each other in the horizontal scanning direction is 21 μm (=25.4 mm/1200). The number of the light emitting elements 411 and 421 is 15360 in total. The interval of the central parts of the light emitting elements 411 and 421 in the vertical scanning direction (up and down direction of FIG. 4) is 105 μm.

Light emitted by the first light emitting element 411 largely passes through the rod lens 611 or 621 positioned directly above such a first light emitting element 411. Since the light emitted by the first light emitting element 411 is diverging light, the light also passes through other rod lenses 611 and 621. The light emitted by the first light emitting element 411 is concentrated on a single spot on the photoconductive drums 21Y~21K by the plurality of rod lenses 611 and 621. Similarly, light emitted by the second light emitting element 421 is concentrated on a single spot on the photoconductive drums 21Y~21K by the plurality of rod lenses 611 and 621.

Figure 5:
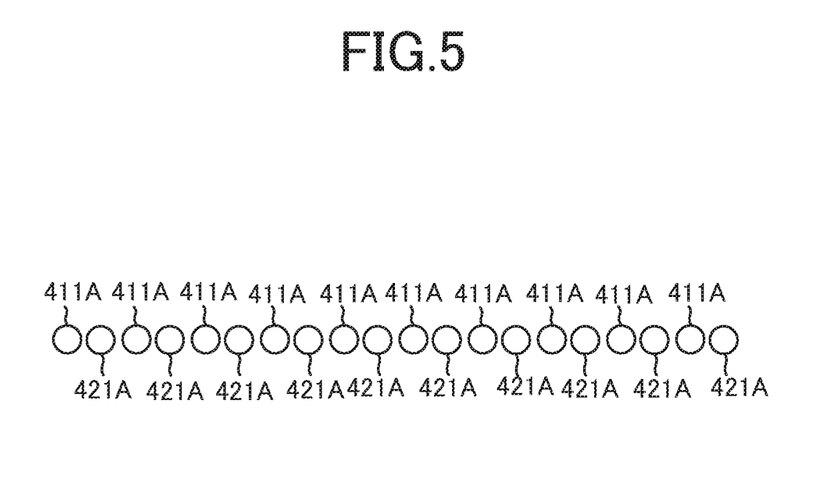
FIG. 5 is a diagram illustrating beam spots formed by light emitting elements on photoconductive drums.

As shown in FIG. 5, on the photoconductive drums 21Y~21K, beam spots 411A formed by the respective first light emitting elements 411 are arranged in a row in the horizontal scanning direction. The interval of the beam spots 411A is the same as the interval of the first light emitting elements 411. Similarly, beam spots 421A formed by the second light emitting elements 421 are arranged in a row in the horizontal scanning direction. The interval of the beam spots 421A is the same as the interval of the second light emitting elements 421.

In the image forming apparatus 1 of the present embodiment, after one of the light emitting elements, 411 (or 421), are lighted while rotating the photoconductive drums 21Y~21K, the other one of the light emitting elements, 421 (or 411), can be lighted. Thus, the beam spots 421A each formed by the other light emitting element 421 can be positioned between the beam spots 411A each formed by the one light emitting element 411 as shown in FIG. 5. In other words, the beam spots 411A and 421A formed by the light emitting elements 411 and 421 can be arranged in a row in the horizontal scanning direction.

In the present embodiment, the light emitting element rows 41 and 42 are provided in two rows in the vertical scanning direction. Thus, by driving the light emitting elements 411 and 421 as described above, the resolution in the scanning direction can become twice as compared to a case in which there is one light emitting element row.

In the present embodiment, the light emitting elements 411 and 421 are arranged in two rows. Thus, the first light emitting elements 411 can be prevented from interfering with the second light emitting elements 421 even when the areas of the light emitting elements 411 and 421 are increased. Thus, in the present embodiment, the areas of the light emitting elements 411 and 421 can be increased without changing the positional relation of the central parts between the first light emitting elements 411 and between the second light emitting elements 421, i.e., without changing the resolution.

Figure 6:
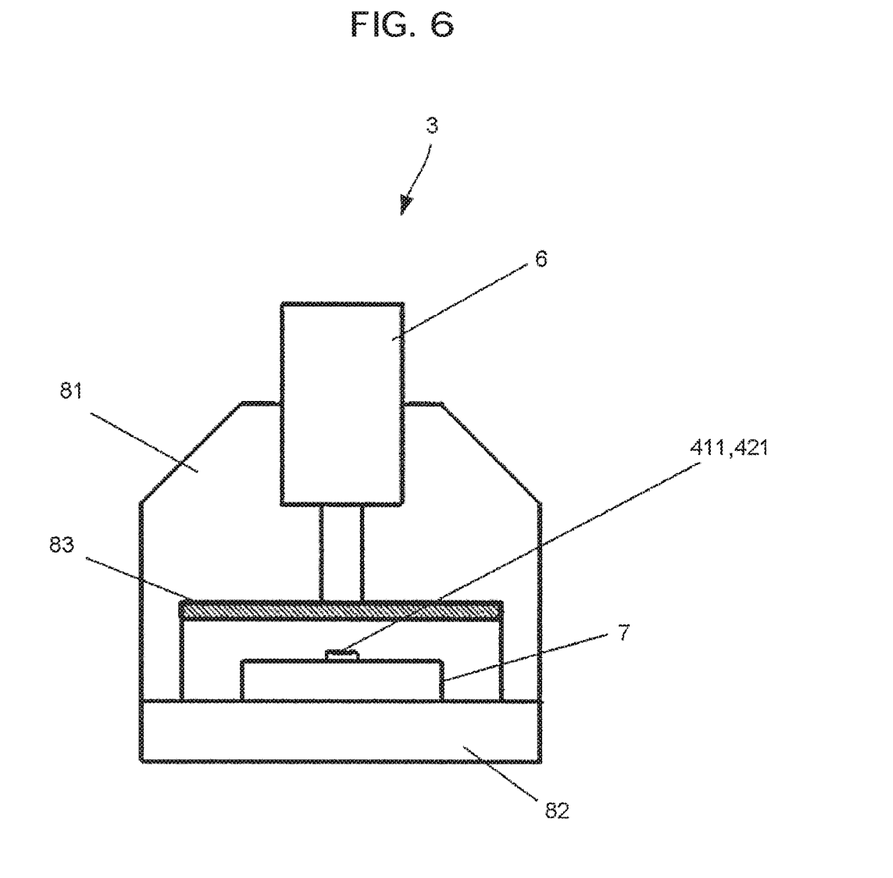
FIG. 6 is a cross-sectional diagram illustrating the optical print head.

FIG. 6 is a cross-sectional diagram illustrating the optical print head 3.

A lid 82 blocks the internal space of a holder 81. The lid 82 holds the substrate 7. The light emitting elements 411 and 421 on the substrate 7 are sealed by a sealing glass 83. The holder 81 positions the rod lens array 6 and positions the substrate 7 at an operating distance of the rod lens array 6.

Figure 7:
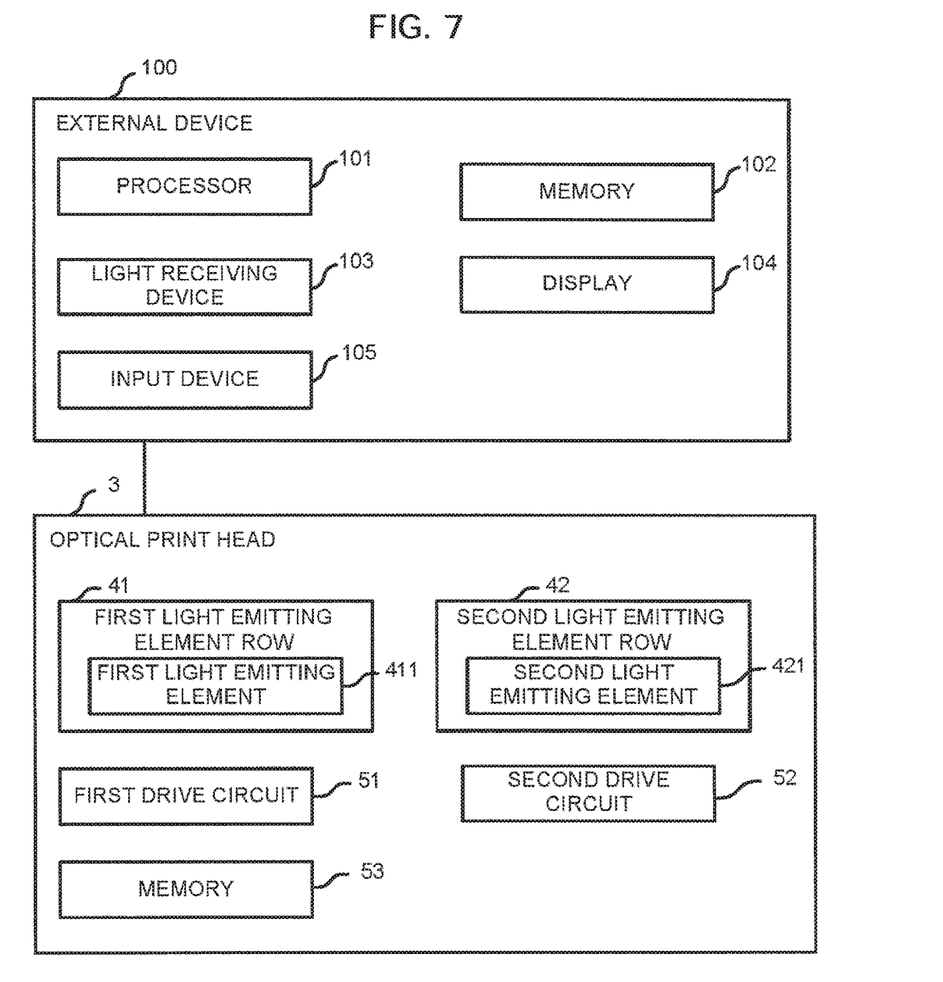
FIG. 7 is a block diagram illustrating components of an external device.

FIG. 7 is a block diagram illustrating components of an external device 100.

In the manufacturing line of the image forming apparatus 1, the external device 100 is connected with the optical print head 3. The external device 100 is equipped with a processor 101, a memory 102, a light receiving device 103, a display 104 and an input device 105. The processor 101 acting as a CPU executes programs stored in the memory 102 to execute various processing of the external device 100. Light emitted by the light emitting elements 411 and 421 through the rod lens array 6 is concentrated on a light receiving surface of the light receiving device 103. The light receiving device 103 is configured so that the light amounts of the beam spots formed by the light emitting elements 411 and 421 on the light receiving surface of the light receiving device 103 are equal to the light amounts of the beam spots 411A and 421A on the photoconductive drums 21Y~21K. The light receiving device 103 may examine the light emitting element rows 41 and 42 by one row at a time. Alternatively, the light receiving device 103 may be configured to examine the two rows of the light emitting elements 411 and 421 simultaneously. The display 104 displays setting information or operation status of the external device 100, log information and notification to the user. The input device 105 including a touch panel or buttons receives input of the user.

The external device 100 executes the following light amount correction processing for suppressing dispersion of light emitted by the light emitting elements 411 and 421 through the rod lens array 6.

Figure 8:
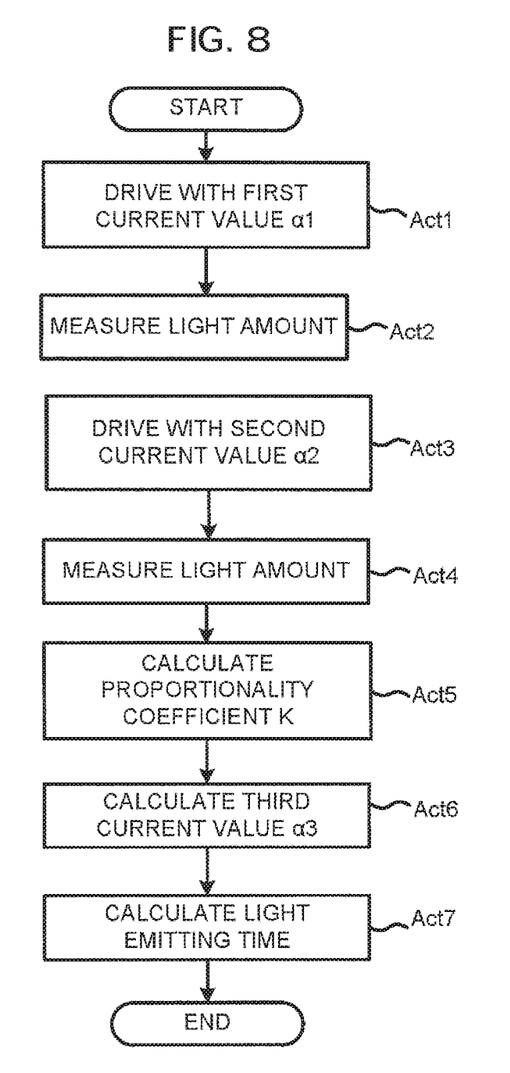
FIG. 8 is a flowchart illustrating a light amount correction method.
Figure 9:
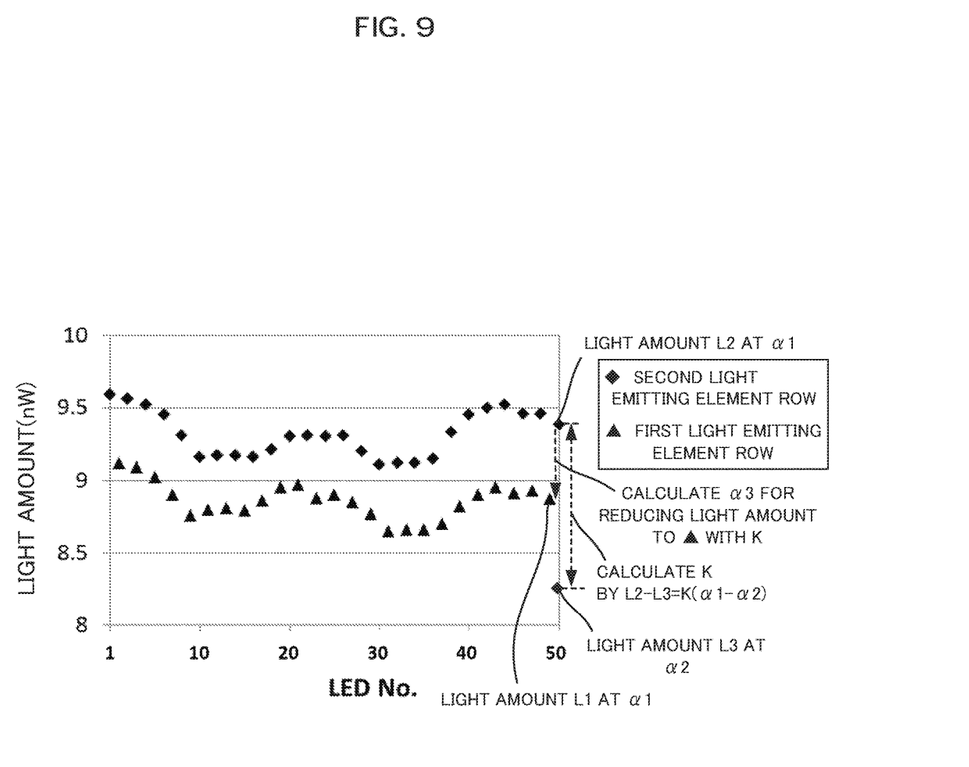
FIG. 9 is a diagram illustrating a measurement result of amounts of light of light emitting elements.

FIG. 8 is a flowchart illustrating the light amount correction method. FIG. 9 shows a measurement result obtained by the external device 100 when the light emitting elements 411 and 421 are driven with a first current value $\alpha 1$ at a first light emitting time T1. The measurement result shows a measurement result of light amounts L1 and L2 of the light emitting elements 411 and 421 through the rod lenses 611 and 621.

The external device 100 drives the light emitting elements 411 and 421 with the first current value $\alpha 1$ at the first light emitting time T1 simultaneously with the drive circuits 51 and 52 (ACT 1).

The external device 100 measures the first light amount L1 of each first light emitting element 411 through the rod lenses 611 and 621, and the second light amount L2 of each second light emitting element 421 through the rod lenses 611 and 621 (ACT 2).

Here, with reference to FIG. 4, as the light emitted by each of the light emitting elements 411 and 421 passes through a position closer to the central part of each of the rod lenses 611 and 621, the light concentrating function by the rod lenses 611 and 621 is more intensified. Consequently, the light amount on the beam spot formed by such light on the photoconductive drums 21Y~21K is increased. Thus, as indicated by a chain line in FIG. 4, ideal positions of the light emitting element rows 41 and 42 are located in a region between the rod lenses 611 and 621 in which distances from the central parts of the rod lenses 611 and 621 to the first light emitting element row 41 are the same as distances from the central parts of the rod lenses 611 and 621 to the second light emitting element row 42.

However, the light emitting elements 411 and 421 is very small as compared to the diameter of each of the rod lenses 611 and 621, and the interval between the light emitting element rows 41 and 42 is also very small. Thus, if the incorporation position of each component is deviated from the ideal position, a case in which the positions of the light emitting element rows 41 and 42 are both biased towards one of the rod lens rows 61 and 62 occurs. In the present embodiment, the positions of the light emitting element rows 41 and 42 are both biased towards the rod lens row 62.

Moreover, in the present embodiment, the second light emitting element row 42 passes through a position closer to the central part of the rod lens 621 than the first light emitting element row 41.

In the present embodiment, the second light emitting element row 42 passes through a position closer to the central part of the rod lens array 62 than the first light emitting element row 41. Thus, the light concentrating function of the rod lens 621 is exerted more strongly on the second light emitting element row 42 than on the first light emitting element row 41. The light concentrating function of the rod lens 611, on the other hand, is exerted more strongly on the first light emitting element row 41 than on the second light emitting element row 42. However, since the rod lens 611 is farther away from the light emitting element rows 41 and 42 than the rod lens 621, the function of the rod lens 611 is weaker than that of the rod lens 621.

Consequently, as shown in FIG. 9, the light amount of the second light emitting element 421 of the second light emitting element row 42 on which the light concentrating function of the rod lens 621 is strongly exerted is 10% on an average more than that of the first light emitting element 411 of the first light emitting element row 41. Thus, when the dispersion of the light in the light emitting element rows 41 and 42 is large as described above, the dispersion of the light of each of the light emitting elements 411 and 421 cannot be sufficiently suppressed through the conventional light amount correction according to the light emitting time, which causes image degradation.

After ACT 2, the external device 100 drives the second light emitting element row 42 having a larger light amount between the light emitting element rows 41 and 42 with a second current value $\alpha 2$ smaller than the first current value $\alpha 1$ at the first light emitting time T1 (ACT 3). The second current value $\alpha 2$ is set to a value so that a third light amount L3 of the second light emitting element 421 at the time of applying a current with the second current value $\alpha 2$ is smaller than the first light amount L1 of the first light emitting element 411 corresponding to the second light emitting element 421. Hereinafter, the first light emitting element 411 corresponding to the second light emitting element 421 refers to the first light emitting element 411 corresponding to the second light emitting element 421 in the vertical scanning direction. Further, the first light emitting element 411 corresponding to the second light emitting element 421 refers to the first light emitting element 411 having the same number as the second light emitting element 421 when the light emitting elements 411 and 421 are each numbered from one side of the scanning direction.

The external device 100 measures the third light amount L3 of each second light emitting element 421 of the second light emitting element row 42 (ACT 4).

The relation between the current value and the light amount is a proportional relation. For example, in FIG. 9, the difference (L2−L3) of the amounts of light of a certain second light emitting element 421 at the time of being driven with the first and the second current values $\alpha 1$ and $\alpha 2$ different from each other is obtained by multiplying a proportionality coefficient K by the difference $(\alpha 1 - \alpha 2)$ of the current values and is indicated by the following formula (1).

$$L2-L3=K\,(\alpha 1-\alpha 2) \tag{1}$$

The external device 100 calculates the proportionality coefficient K based on the formula (1) (ACT 5).

The external device 100 calculates a third current value $\alpha 3$ of a certain second light emitting element 421 based on the following formula (2) when the light amount at the time of driving the second light emitting element 421 at the first light emitting time T1 is equal to the first light amount L1 at the time of driving the first light emitting element 411 corresponding to the second light emitting element 421 with the first current value $\alpha 1$ at the first light emitting time T1 (ACT 6).

$$L2-L1=K\,(\alpha 1-\alpha 3) \tag{2}$$

By driving each of the second light emitting elements 421 with the third current value $\alpha 3$, a light amount L3 of each second light emitting element 421 (e.g., LEDs No. 1~50 in FIG. 9) becomes substantially the same as the light amount L1 of each of the first light emitting elements 411 (e.g., LEDs No. 1~50 in FIG. 9) corresponding to each second light emitting element 421 and driven with the first current value $\alpha 1$.

As described above, in this correction processing, the levels of the light amounts of the light emitting element rows 41 and 42 are first equalized by correcting the current values of the light emitting element rows 41 and 42. Thereafter, the light emitting time of each of the light emitting elements 411 and 412 is corrected by the following processing ACT 7 to suppress the dispersion of the light of each of the light emitting elements 411 and 412.

The external device 100 calculates a second light emitting time T2 at which a target light amount (reference light amount) is obtained for each first light emitting element 411 at the time of executing the PWM control by taking the current value of the first light emitting element 411 as the first current value α1.

The external device 100 calculates a third light emitting time T3 at which a target light amount is obtained for each second light emitting element 421 at the time of executing the PWM control by taking the current value of the second light emitting element 421 as the third current value α3.

The external device 100 writes the correction information such as the first and the third current values α1 and α3 and the second light emitting time T2 and the third light emitting time T3 into the built-in memory 53 (FIG. 7) of the optical print head 3 (ACT 7).

If the optical print head 3 is incorporated in the apparatus and receives an instruction for driving the light emitting elements 411 and 421, the first and the second drive circuits 51 and 52 drives the light emitting elements 411 and 421 according to the correction information.

In this case, the first drive circuit 51 drives each first light emitting element 411 with the same first driving current value (e.g., the first current value α1). The first drive circuit 51 drives, based on the second light emitting time T2 calculated for each of the first light emitting elements 411, each first light emitting element 411 at the light emitting time corresponding to each target gradation value, respectively.

The second drive circuit 52 drives each second light emitting element 421 with the same second driving current value (e.g., the third current value α3). The second drive circuit 52 drives, based on the third light emitting time T3 calculated for each of the second light emitting elements 421, each second light emitting element 421 at the light emitting time corresponding to each target gradation value, respectively.

In the present embodiment, as the drive circuits 51 and 52 are provided for each of the light emitting element rows 41 and 42, the light emitting element rows 41 and 42 can be driven with different current values and the dispersion of the light of the light emitting element rows 41 and 42 can be suppressed.

In the conventional technique, the dispersion of light among the light emitting elements 411 and 421 is adjusted by adjusting the light emitting time. When the optical print head 3 includes a plurality of light emitting element rows 41 and 42, however, the dispersion of light of the light emitting element rows 41 and 42 may be large as shown in FIG. 9. In this case, the dispersion of the light of the light emitting element rows 41 and 42 cannot be sufficiently suppressed through the conventional light amount correction according to the light emitting time, which causes image degradation.

According to the present embodiment, however, the levels of the light amounts of the light emitting element rows 41 and 42 are equalized by correcting the current values of the light emitting element rows 41 and 42. After that, the dispersion of the light of each of the light emitting elements 411 and 421 is corrected with the light emitting time in the present embodiment. Thus, even when the dispersion of the light of the light emitting element rows 41 and 42 is large, such dispersion can be sufficiently corrected.

The number of the first drive circuit 51 for driving the first light emitting element row 41 is not limited to one. The first light emitting elements 411 may be classified into several groups and a plurality of the first drive circuits 51 may be set respectively corresponding to the groups. The second drive circuit 52 is the same as the first drive circuit 51.

The drive circuits 51 and 52 may be arranged at positions sandwiching the first and the second light emitting element rows 41 and 42 in the vertical scanning direction.

In the above embodiment, the external device 100 is configured to equalize the light amount of the second light emitting element row 42 with the light amount of the first light emitting element row 41 by decreasing the current value of the second light emitting element row 42 having a larger light amount. Alternatively, the light amount of the first light emitting element row 41 may be equalized with the light amount of the second light emitting element row 42 by increasing the current value of the first light emitting element row 41 having a smaller light amount. In the case of decreasing the current value, the light amounts of the light emitting elements 421 and 411 are more likely to decrease to the target value even when some of the light emitting elements 421 and 411 have inadequate quality. In the case of increasing the current value, however, when some of the light emitting elements 421 and 411 have inadequate quality, there is a possibility that the light amounts of such light emitting elements 421 and 411 cannot achieve the target value. Thus, in the light amount correction processing, it is more preferable that the light amount of the second light emitting element row 42 be equalized with the light amount of the first light emitting element row 41 by decreasing the current value of the second light emitting element row 42 having a larger light amount.

The lens array for concentrating the light emitted by the light emitting elements 411 and 421 may be a lens array other than the rod lens array 6.

As described above in detail, according to the technology described in the specification, a technology for suppressing the dispersion of the light from the optical print head can be supplied.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An optical print head comprising:
a first element row configured to be on one face of a substrate and include arrangement of first light emitting elements in a first direction;
a second element row configured to be on the one face and include arrangement of second light emitting elements in the first direction, second light emitting elements positioned alternately with the first light emitting elements in the first direction, the second element row positioned at one side of a second direction orthogonal to the first direction with respect to the first element row;
a lens array configured to concentrate light emitted by the first light emitting elements and the second light emitting elements, and to comprise a first lens row of first lenses arranged in the first direction and a second lens row of second lenses arranged in the first direction, second lenses positioned alternately with the first lenses in the first direction;

a first drive circuit configured to be on the one face and positioned at the other side of the second direction with respect to the first element row, and to drive each first light emitting element; and a second drive circuit configured to be on the one face and positioned at one side of the second direction with respect to the second element row, and to drive each second light emitting element.

2. The optical print head according to claim 1, wherein
the first drive circuit is positioned at a location nearest to the first light emitting element located at the end of one side of the first direction among the first light emitting elements; and
the second drive circuit is positioned at a location nearest to the second light emitting element located at the end of the one side of the first direction among the second light emitting element.

3. The optical print head according to claim 2, wherein the first drive circuit faces the second drive circuit in the second direction.

4. The optical print head according to claim 1, wherein the lens array faces the one face.

5. The optical print head according to claim 1, wherein the first light emitting element and the second light emitting element are organic electroluminescence elements.

6. The optical print head according to claim 1, wherein the optical print head is for exposing a photoconductor.

7. An image forming apparatus, comprising:
a photoconductor;
an optical print head comprising:
 a first element row configured to be on one face of a substrate and include arrangement of first light emitting elements in a first direction;
 a second element row configured to be on the one face and include arrangement of second light emitting elements in the first direction, second light emitting elements positioned alternately with the first light emitting elements in the first direction, the second element row positioned at one side of a second direction orthogonal to the first direction with respect to the first element row;
 a lens array configured to concentrate light emitted by the first light emitting elements and the second light emitting elements, and to comprise a first lens row of first lenses arranged in the first direction and a second lens row of second lenses arranged in the first direction, second lenses positioned alternately with the first lenses in the first direction;
 a first drive circuit configured to be on the one face and positioned at the other side of the second direction with respect to the first element row, and to drive each first light emitting element; and
 a second drive circuit configured to be on the one face and positioned at one side of the second direction with respect to the second element row, and to drive each second light emitting element, the optical print head configured to expose the photoconductor by the first element row and the second element row to form an electrostatic latent image on the photoconductor; and
a developing device configured to develop the electrostatic latent image to form a toner image on the photoconductor.

8. The image forming apparatus according to claim 7, wherein
the first drive circuit is positioned at a location nearest to the first light emitting element located at the end of one side of the first direction among the first light emitting elements; and
the second drive circuit is positioned at a location nearest to the second light emitting element located at the end of the one side of the first direction among the second light emitting element.

9. The image forming apparatus according to claim 8, wherein
the first drive circuit faces the second drive circuit in the second direction.

10. The image forming apparatus according to claim 9, wherein
the lens array faces the one face.

* * * * *